(12) United States Patent
Renard et al.

(10) Patent No.: US 7,329,457 B2
(45) Date of Patent: Feb. 12, 2008

(54) THIN COMPOSITE LAMINATE AND USE THEREOF IN MAKING SPORTS ARTICLES, ESPECIALLY BOOTS

(75) Inventors: Philippe Renard, Moucy (FR); Manuel Roure, Meythet (FR)

(73) Assignee: Salmon S.A., Metz-Tessy (FR)

( * ) Notice: Subject to any disclaimer, the term of this patent is extended or adjusted under 35 U.S.C. 154(b) by 815 days.

(21) Appl. No.: 09/977,698

(22) Filed: Oct. 16, 2001

(65) Prior Publication Data
US 2002/0064640 A1 May 30, 2002

(30) Foreign Application Priority Data
Oct. 17, 2000 (FR) .................................. 00 13287

(51) Int. Cl.
*B32B 27/12* (2006.01)

(52) U.S. Cl. ................ 428/297.4; 428/299.1; 428/299.4

(58) Field of Classification Search ................ 428/546, 428/548, 614, 615, 114, 137, 172, 189, 190, 428/191, 193, 201, 212, 299.1, 297.4, 299.4
See application file for complete search history.

(56) References Cited

U.S. PATENT DOCUMENTS

| | | | |
|---|---|---|---|
| 3,779,851 A | 12/1973 | Hertz | .......................... 156/309 |
| 3,873,168 A | 3/1975 | Viola et al. | .................. 308/238 |
| 4,889,763 A * | 12/1989 | Brambach | .................... 442/223 |
| 5,599,242 A | 2/1997 | Solviche et al. | ............ 473/318 |
| 5,665,295 A * | 9/1997 | Takamoto et al. | ...... 264/172.19 |
| 6,431,083 B1 * | 8/2002 | Carstensen et al. | ....... 105/238.1 |

FOREIGN PATENT DOCUMENTS

| | | |
|---|---|---|
| FR | 2730416 | 8/1996 |
| FR | 2742063 | 6/1997 |
| GB | 1519310 | 7/1978 |
| GB | 2256784 | 12/1992 |
| WO | WO 96/26655 | 9/1996 |

* cited by examiner

*Primary Examiner*—Milton I. Cano
*Assistant Examiner*—Camie S. Thompson
(74) *Attorney, Agent, or Firm*—Greenblum & Bernstein, P.L.C.

(57) ABSTRACT

Laminated composite material usable to make articles of manufacture, such as boots or other sports articles in particular. The laminate is a new basic material particularly directed to articles of manufacture having drastic mechanical requirements and which are very inexpensive and lightweight. The laminate has a sandwich structure having a core between two layers. More particularly, the core and the two layers are composites, and at least a portion of the fibers of the core have a mechanical strength significantly lower than that of at least a portion of the fibers of one and/or the, other layers. In a particular embodiment, the laminate has a thickness of 3 mm or less. The layers are sheets of carbon fabric embedded in an epoxy resin, and the core is made from non-woven polyamide micro-fibers having a thickness equal to 0.32 mm. The invention also relates to the manufacture of the laminate.

24 Claims, 7 Drawing Sheets

THIN COMPOSITE LAMINATE AND USE THEREOF IN MAKING SPORTS ARTICLES, ESPECIALLY BOOTS

CROSS-REFERENCE TO RELATED APPLICATION

This application is based upon French Patent Application No. 00 13287, filed Oct. 17, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to the field of composite materials, and more specifically composite laminates made of fibers that are organized or not organized as fabrics or plies and fixed in matrices made of polymer resin.

More specifically, the invention relates to a composite laminate in the form of a thin sheet, which can be used to manufacture sports articles such as sports boots (bottom assembly, vamp/upper), roller skates, skis, snowboards, skate-boards, golf clubs, scooters, cycles (frames, wheels), fishing rods, racquets, cross-country ski poles, backpack frames, tent pegs, for example.

2. Description of Background and Relevant Information

Composite materials are materials which have a thermohardening or thermoplastic polymer matrix and a fibrous reinforcement, and possibly granular fillers and additives. The polymer matrix plays the role of a binder for the fibers of the reinforcement. It distributes and ensures the transmission of the forces to the fibers. The fibrous reinforcement, oriented (woven or non-woven) or random (non-woven) provides the finished composite with the mechanical strength and rigidity properties. These composites are used as raw material in the automotive industry, shipyards, aircraft industry, textile industry, sports article industry (boots, skis, golf clubs . . . ). 65% of the manufactured composites are glass fiber-reinforced polyester or vinylester resins manufactured according to the open molding technique. The remaining 35% are formed by special resins (phenolic resin, polyurethane resin, and silicone resin), reinforced by carbon or aramide fibers.

The composites can be in the form of sandwich or laminated constructions, formed by a plurality of superimposed fibrous layers embedded in the matrix. In these composite laminates (or sandwiches), one distinguishes a central structure, also called composite core or central member, linked through each of its surfaces to an external composite layer. These sandwich or laminated composite constructions have the characteristic of being relatively lightweight and extremely rigid. This stiffness is such that deformability is very reduced. It is then easily understood that such mechanical properties render difficult the working and shaping of the pieces obtained in composite laminates.

U.S. Pat. No. 3,873,168 describes an article made of composite laminate having a body 14 constituted by a polyamide cross-linkable resin and reinforced by a glass fiber. This body is inserted between two composite outer bearing portions whose matrix is also made of cross-linkable polyamide resin, and whose fibrous reinforcement is formed by a graphite fiber. The composite laminate according to U.S. Pat. No. 3,873,168 has the disadvantage of being too rigid and relatively expensive. Indeed, the fibers used are high performance, therefore costly fibers or fiber fabrics.

U.S. Pat. No. 3,779,851 discloses a composite laminate constituted of a plurality of graphite fiber sheets impregnated with epoxide resin. This laminate is presented as having a very high mechanical strength to weight ratio, as well as very low thermal expansion properties. Such specifications are desired for applications of these composite laminates in the manufacture of optical instruments (mirror). These are also extremely rigid composite laminates. The total thickness of the composite laminates according to U.S. Pat. No. 3,779,851 is 3.6 mm, for example, even 3 mm as a minimum (12 inches×0.254). The sheets used to manufacture this laminate are sheets preimpregnated with carbon fibers in an epoxy resin matrix. This composite laminate has a too substantial stiffness to be used as raw material in the manufacture of sports articles, such as boots, for example, where a certain deformability or bending ability in the longitudinal direction is needed. In addition, the fibrous reinforcement is exclusively made of carbon fibers. This results in a prohibitive cost for fields of application such as that of sports articles, which are produced at large scale and at very low cost, contrary to what can be found in frontier technological fields, such as aeronautics or aerospace.

Furthermore, it is known to use shock absorbing means constituted by laminated structures including composites in sports articles, in particular gliding members, such as skis, ice-skates, roller skates, snowboards.

Thus, the French Patent Application No. 2 742 063 discloses a roller skate chassis having a shock absorbing means, constituted by a laminate including, successively, a rigid stress layer and a viscoelastic layer. The laminate can include one or several pairs of rigid layer/viscoelastic layer. The rigid layer is made of a plastic material having a high modulus of elasticity, from composite fibers or from aluminum, these materials being selected for their rigidity or their lightweight. The viscoelastic layer is made of rubber or of synthetic elastomer. To obtain the desired shock absorbing effect, the composite-rubber laminate according to FR 2 742 063 necessarily has a thickness greater than or equal to 3 mm. Moreover, this composite laminated shock absorbing means remains perfectible in terms of deformability, cost, and weight gain.

The French Patent Application Publication No. 2 730 416 describes a golf club shaft constituted by a laminate having a composite outer layer made of resin reinforced with:
- carbon fibers, a central core (or central member) made of polymer foam, synthetic or natural resin, cork, wood or the like; and
- an inner composite layer made of glass fiber-reinforced resin.

The density of the composite inner and outer layers is greater than 1.2 kg/dm$^3$ and their longitudinal Young's modulus E1 is greater than 20 Gpa. The polymer foam core has a density lower than 1.2 kg/dm$^3$ and a longitudinal Young's modulus E3 lower than 20 Gpa. This composite laminate has a thickness between 0.2 and 9 mm. Here again, it has been found that the stiffness/deformability/durability/weight gain compromise is not entirely satisfactory for this composite/polymer foam/composite laminate according to this French Patent Application Publication No. 2 730 416.

This review of the state of the art shows that the manufacturers of sports articles are always looking for a raw material having the mechanical properties of the composites in terms of maximum stiffness and minimum deformability, combined with a vibration dampening capacity, which is inexpensive and lightweight. These manufacturers also expect such a raw material to be easily industrially workable and shapable and, finally, to preserve its mechanical properties over a long period of time.

SUMMARY OF THE INVENTION

Under the aforementioned circumstances, one of the primary objects of the present invention is to propose a new basis material for making articles of manufacture, in particular sports articles, which have drastic mechanical requirements, are very inexpensive and as lightweight as possible.

These objects, among others, are achieved by the present invention which relates primarily to a composite laminate having a sandwich structure made of a core inserted between two layers, wherein:

the core and the two layers are composite;
at least a portion of the fibers of the core are fibers whose mechanical strength is significantly lower than that of at least a portion of the fibers of one and/or the other layer.

Credit goes to the inventors to have been able to show, as a result of long and tedious research, and in a quite surprising and unexpected manner, that an entirely composite micro-sandwich structure can be obtained, in which the core includes a fiber-reinforced resin whose mechanical properties are lower than those of reinforcing fibers of the composite layers arranged on both sides of the core. Indeed, unexpectedly, this introduction of fibers, which have no mechanical strength and have little economical value, has not prejudiced the mechanical properties of the laminated composite material.

Due to the invention, a laminated composite material, which is lightweight, economical, and has high mechanical properties, is made available.

The invention also relates to one of the methods of manufacturing the aforementioned laminate, the use of this laminate to make sports articles, especially boots, and the article thus made.

BRIEF DESCRIPTION OF DRAWINGS

The invention will be better understood from the following detailed description of preferred examples of embodiment of the laminate according to the invention, with reference to the annexed drawings, in which.

DETAILED DESCRIPTION OF THE INVENTION

Figure 1:
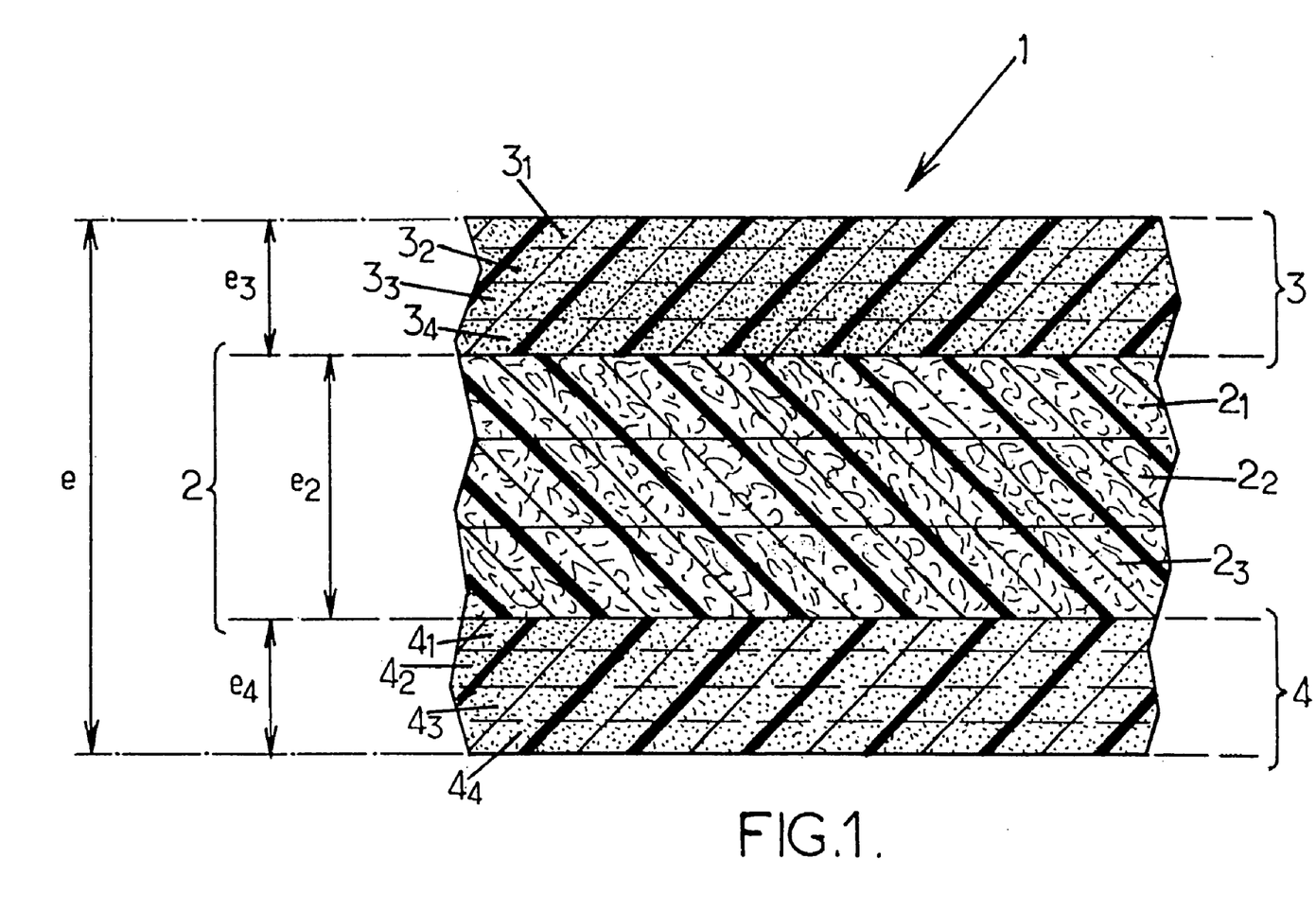
FIG. 1 schematically shows a partial cross-section of the laminate according to the invention.

FIG. 1 shows the composite laminate 1 according to the invention. The latter is constituted of a sandwich structure having a core or central member 2 inserted or sandwiched between two layers 3 and 4. This core 2 and these layers 3 and 4 are of the composite type, i.e., formed by a polymer resin matrix, preferably the same for all three, and reinforced by fibers (fibrous materials). The fibrous material of the layers 3 and 4 is constituted by high performance fibers, whereas the fibrous material of the core 2 includes fibers which have low mechanical properties and are preferably inexpensive.

Advantageously, the fibrous material of the core and/or of the layers is in the form of:

linear continuous assemblies of (micro)fibers combined in strands or wicks of various shapes (glass strands, single strands, cabled strands, wicks, rowing);

non-linear strands (discontinuous), chopped glass strands or milled fibers;

mats: chopped strand mat or continuous strand mat, surface mat, needled mat; or fabrics with plain or linen weave, satin weave, twill weave, high modulus weave, unidirectional weave, or ribbon weave.

According to a preferred arrangement of the invention, the core 2 and layers 3 and 4 are each constituted by a plurality of plies—in this case 3 for the core 2 ($2_1$, $2_2$, $2_3$) and 4 for the layers 3 and 4 ($3_1$, $3_2$, $3_3$, $3_4$, $4_1$, $4_2$, $4_3$, $4_4$, respectively). In practice, the core 2 and/or the layer(s) 3 and 4 are obtained by superimposing a plurality of plies of fibrous and/or composite materials. Thus, the composite laminate 1 according to the invention has one or several plies forming the core, or one or several plies forming the layers, these plies being formed by sheets of micro-fibers that are woven or non-woven, oriented or non-oriented, preimpregnated or non-preimpregnated with resin.

According to a preferred characteristic of the invention, the laminate has a total thickness "e" less than or equal to 3 mm, preferably less than 2.5 mm.

The thickness $e_2$ of the core 2 is advantageously less than or equal to 2 mm, preferably less than 1.5 mm.

Furthermore, the ratio of the thickness of the core $e_2$, to the total thickness of the two layers $e_3+e_4$ is preferably defined as follows:

$$e_2 \Big/ \frac{e_3+e_4}{2} \leq 5$$

$$\text{preferably } e_2 \Big/ \frac{e_3+e_4}{2} \leq 4$$

$$\text{and even more preferably } 0.1 \leq e_2 \Big/ \frac{e_3+e_4}{2} \leq 3.5.$$

With respect to the type and structure of the fibrous material of the core 2, it must be noted that the reinforcement fibers of this core 2 are woven or non-woven, oriented in one or more directions or non-oriented, and are preferably selected from the group including:

the textile (micro)fibers made of:
synthetic polymers: polyamides (NYLON®), polyolefine, polyesters, polyesterimides . . .
natural polymers: silk, cotton, linen, jute, hemp,
the cellulose fibers.

By way of examples of fibrous reinforcement for the core 2, one can cite all of the natural or synthetic fabrics, in particular silk, polyamides (NYLON®), such as a textile used as a lining in garments, for example, and constituted of an non-woven material made of nylon micro-fibers (CAMBRELLE®), or other textiles such as linen, cotton, jute, leno, BEMBERG®; any type of paper: aquarelle paper, blotting paper, kraft paper, absorbent paper, toilet paper, newsprint, e.g.; any type of carton.

In fact, suitable are all of the fibrous materials which can be in the form of fine sheets and can be impregnated with polymer resin, and capable of forming the fibrous reinforcement of the core 2 of the laminate according to the invention, provided that it has low market value.

With respect to the fibrous reinforcement of the layers, the fibers of which it is made, whether they are woven or non-woven, oriented in one or several directions or non-oriented, are preferably selected, according to the invention, from the group of high performance (micro)fibers including:

carbon (micro)fibers;

glass (micro)fibers;

synthetic polymer (micro)fibers, in particular polyolefines, more specifically oriented and stretched high density polyethylene fibers DYNEEMA®, polyamide fibers KEVLAR® TEVARON®, and other fibers such as VECTRAN® or SPECTRA®;

metallic (micro)fibers, in particular aluminum, titanium or boron (micro)fibers;

natural (micro)fibers such as silk.

Possibly, one can envision using mixtures of these fibers.

Preferably, the fibers of the layers are glass fibers, (for example E glass, R or S glass, D glass, silica fibers), carbon fibers, oriented and stretched high density polyethylene fibers (DYNEEMA®), aluminum or polyamide fibers (KEVLAR®).

As indicated hereinabove, one of the main characteristics of the invention rests on the selection of a fibrous reinforcement for the core 2 of the micro-sandwich, of lesser quality or mechanical strength with respect to the fibrous reinforcement of the outer layers 3 and 4.

In the sense of the invention, this notion of lesser quality or mechanical strength can be perceived through at least one of the following mechanical properties specific to the fibers forming the fibrous reinforcement of the core 2:

the micro-fibers of the core 2, woven or non-woven, oriented in one or several directions or non-oriented, have a characteristic of rupture stress CR (in Mpa) in longitudinal traction such that:

$CR \leq 1\ 500$ preferably $CR \leq 1\ 000$ and even more preferably $CR \leq 750$ the micro-fibers of the core 2, woven or unwoven, oriented in several directions or non-oriented, have a modulus M (in Mpa) in longitudinal traction such that:

$M \leq 50\ 000$ preferably $M \leq 30\ 000$ and even more preferably $M \leq 20\ 000$ the micro-fibers of the core 2, woven or unwoven, oriented in several directions or non-oriented, have an elongation at rupture AR (in %) in longitudinal traction, such that:

$AR \geq 1.0$ preferably $AR \geq 1.5$ and even more preferably $AR \geq 2.0$.

Another criterion for selecting the fibers of the core 2 is associated with their price. Thus, the fibers of the core 2 are preferably selected from among the fibers having an average market value at least twice, preferably at least five times, and even more preferably at least 10 times lower than that of the fibers of the layer(s).

The fibrous reinforcements of the core 2 and/or of the layers 3 or 4 can be in the form of continuous strands or of more or less sophisticated semi-products, such as dried fibers, dried fabrics, preimpregnated fabrics, pultruded products.

According to an advantageous characteristic of the invention, the core 2 of the composite laminate has vibration dissipation properties (shock absorption).

For evident reasons of ease of manufacturing, the embodiments in which the matrix of the core 2 and of the layers 3 and 4 is constituted by a single product are preferred.

Thus, these matrices/binders are selected, for example, from among the organic thermohardening or thermoplastic resins:

phenolic;
polyester;
vinylester;
polyesterimide;
polyaramide;
epoxide;
polyamide;
polycarbonate;
polyterephthalate;
polyphenylene oxide;
polyacetal;
polyamide;
polysulphide;
polyolefine.

By way of practical examples, one can cite epoxide resins, phenolic resins, vinylester resins and polyester resins.

Depending on the applications and, therefore, the desired mechanical properties, it is possible to introduce filters or additives into the composites of the core 2 or of the layers 3 and 4 of the laminate 1 according to the invention. These fillers/additives are selected, for example, from the group including: catalysts, accelerators, parting agents, fireproofing agents, anti-UV agents, fungicides, chalk, silica, china clay, titanium oxide, glass, metal powders, quartz, mica.

According to another interesting alternative embodiment of the invention, at least one of the layers of the laminate 1 is transparent so that the core 2 is visible, the latter advantageously including decorating elements. This variation could be used in applications such as skis, snowboards, skateboards, roller skates, surfboards, among others.

The laminate or micro-sandwich 1 according to the invention can also be defined through a rigidity characteristic R measured in a bending test Tf.

Figure 2A:
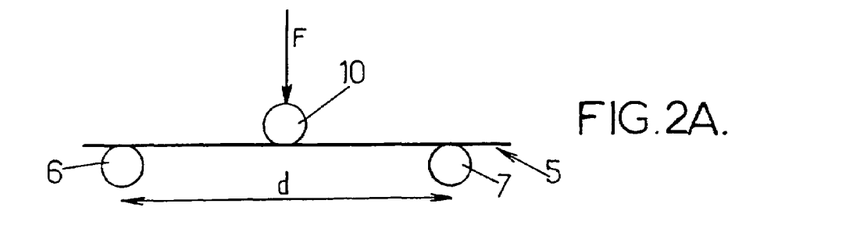
FIGS. 2A and 2B are diagrams explaining a test Tf evaluating the composite laminate mechanical strength.
Figure 2B:
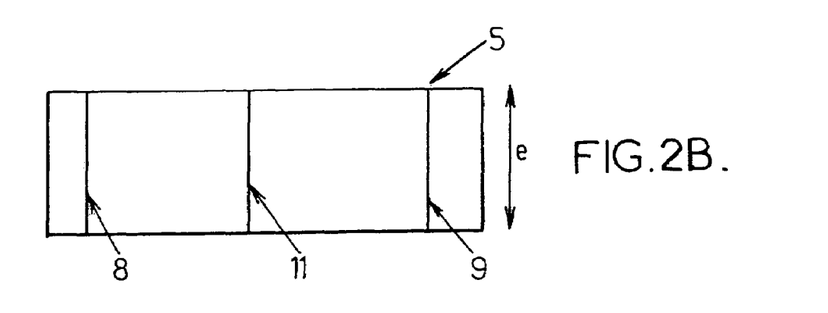

The procedure for the test Tf is as follows: Rectangular test pieces measuring 90×50 mm are used. The dimensions for the test are fixed, regardless of the test piece tested. The figure shows the width 1 of the test piece 5 equal to 50 mm.

These test pieces are subject to a three-point bending test on a conventional traction machine. The device used is shown in a side view in FIG. 2A and in a top view in FIG. 2B. The 90×50 mm rectangular test piece is designated by the reference numeral 5. This test piece 5 rests on two parallel, to 10 mm and whose length is substantially equal to the width of the test piece, i.e., 50 mm. The cylindrical metal bars 6, 7 define support lines 8, 9, respectively, shown in FIG. 2B. A force F is applied via a third cylindrical metal bar 10, identical and parallel to the bars 6, 7, and resting on the upper surface of the test piece 5 so as to define a support line 11. The latter is arranged substantially in the middle of the distance d separating the support lines 8, 9 of the support cylinders 6, 7. The distance d between the support lines 8 and 9 is 80 mm. This test Tf makes it possible to determine the Young's modulus of the test piece, which can be a composite micro-sandwich laminate 1 according to the invention. Likewise, one can evaluate its tensile strength, as well as its bending deflection before break. Based on these results, the rigidity R of the test piece is expressed in a non conventional unit, namely: N/mm. This corresponds to the force necessary to obtain one millimeter of deflection measured when bending begins. The results are expressed in relation to a specimen/standard test piece, which is made of carbon fibers of the T 700 type from TORAY. The carbon fibers used are in the form of a preimpregnated fabric having the following characteristics: 193 g/m$^2$ and are sold under the name VICOTEX® by HEXCEL Composites. The resin of the matrix is an epoxide resin M10 by HEXCEL Composites.

Thus, according to a preferred characteristic of the invention, the laminate according to the invention has a characteristic of tensile strength R in a bending test Tf in relation to a specimen test piece made of a carbon fiber composite having the same shape and rigidity as those of the test pieces tested, such that:

$R \geq 50$, preferably $R \geq 60$, and even more preferably $R \geq 70$.

With respect to the manufacture of the composite laminates 1 according to the invention, it is possible to use all of the methods known to a person with ordinary skill in the art specializing in composites. By way of examples, one can cite:
- the manual methods by contact or by projection;
- the medium scale methods by vacuum or injection molding (RTM);
- the methods by press molding, low-pressure and cold molding, mean-pressure and hot molding, or high-pressure and hot molding (SMC-TER);
- the method by continuous laminating by pultrusion, by automolding or by injection of thermoplastics;
- the methods by reaction injection molding (RIM) applied in particular to polyurethane (pure RIM, R-RIM, S-RIM).

In the cases where the assembly of the various layers of the composite laminate is not obtained by the above-mentioned methods, one can instead or in addition use adhesive assemblies by means of appropriate adhesives.

In a non-limiting fashion, two embodiments of a method of manufacturing the composite laminate according to the invention are called for in the present disclosure.

In the first embodiment, dried fibrous reinforcements (mats, plies of strands oriented in one or several directions, fabrics) are used. The fibrous reinforcement of the core 2 is thus constituted by one or several superimposed sheets (of paper, for example) or of fabrics (silk, for example) or of non-woven, for example, CAMBRELLE®=nylon micro-fibers. Each layer 3 and 4 has a fibrous reinforcement that is constituted of one or several plies of a fibrous material (carbon fibers, oriented or non-oriented, woven or non-woven). All or part of the plies of the layers 3-4 and possibly of the core 2 are impregnated with a cross-linkable resin (for example, epoxide resin). The stack of resin impregnated plies is subject to high pressure (for example, 8 bars). Advantageously, heat is applied to accelerate cross-linking (for example at 150° C.). Preferably, the dried core is arranged between the layers, and both layers are then impregnated with resin.

According to the second embodiment of the method, the ply(ies) forming the layer(s) 3-4 and/or the core 2, are constituted by a resin-preimpregnated fibrous material. The stacking is then undertaken to obtain the micro-sandwich; pressure and possibly heat are applied as provided in the first embodiment. For the layers, the preimpregnated fabric used can be a multidirectional or unidirectional fabric of carbon fibers on which the resin is deposited. The excess of resin is eliminated via passage between rollers which are heated or non-heated (calendering). Before use, the product must be kept refrigerated, generally below 18° C. to avoid resin polymerization. The fabrics must be brought back to the ambient temperature in order to be used. When the fibrous reinforcement of the layers 3-4 is not made of carbon fibers but of high-density polyethylene fibers, the pressure used is 2 bars and the temperature is 100° C. In any event, the person with ordinary skill in the art is capable of adjusting these parameters depending on the types of materials used.

According to another one of its aspects, the invention relates to the use of the laminate as defined hereinabove for manufacturing sports articles, and especially:
- boots, in particular bottom assembly or upper, and more specifically sports boots;
- sports articles, in particular roller skates, skis, snowboards, skateboards, golf club shafts and heads, scooters, cycles, fishing rods, racquets, helmets, cross-country ski poles, backpack frames, tent pegs . . .

Furthermore, the invention also relates to the articles, in particular the sports articles such as made by using the aforementioned micro-sandwich composite laminate.

Finally, the laminate according to the invention can be used to obtain a composite laminate layer, in particular of the type of those having a thickness greater than 3 mm.

EXAMPLE 1

Figure 3A:
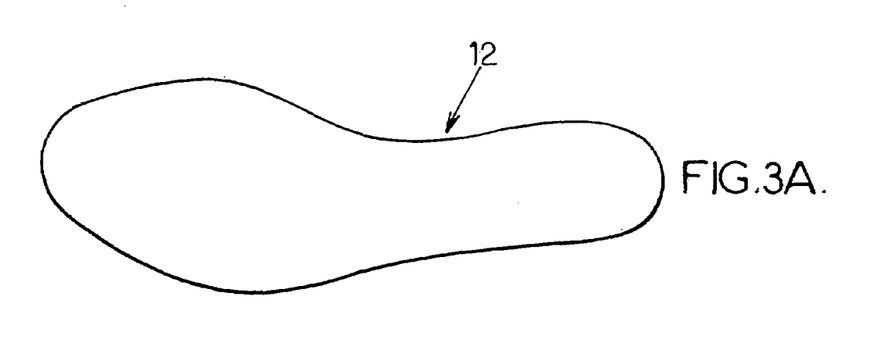
FIGS. 3A and 3B are top and longitudinal cross-sectional views, respectively, of a boot lower portion element (bottom assembly), in this case the lasting insole, constituted by the composite micro-sandwich according to the invention.
Figure 3B:
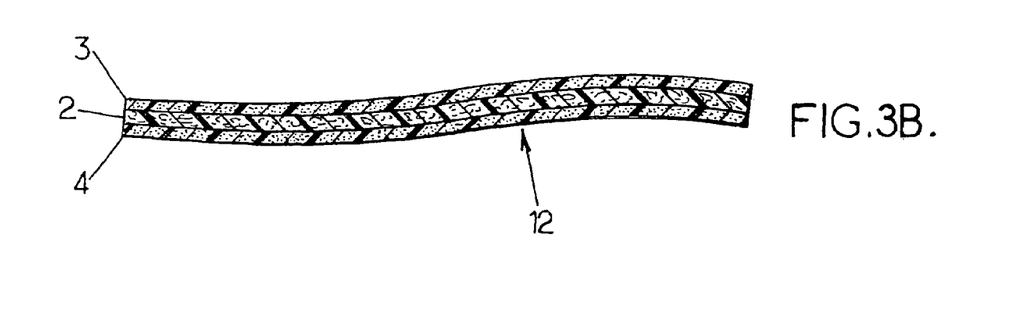

By way of illustration, the preparation of a constituent element of the lower portion (bottom assembly) of a boot, for example a sports boot, is described hereinafter: insole, whole length sock, and lasting insole. FIGS. 3A and 3B show this bottom assembly element 12 constituted by a composite laminate according to the invention. The latter includes the two outer layers 3, 4 and an inner core 2.

The fibrous reinforcements used are:
- for the layers 3-4: preimpregnated sheets of carbon fabric which have a surface density of 193 g/m$^2$, a thickness equal to 0.19 mm and are sold under the name VICOTEX®/HEXCEL. The orientation of the fibers in the carbon fabric is 0°/90°,
- for the core 2: a non-woven of polyamide micro-fibers (NYLON®), having a thickness equal to 0.32 mm and sold under the name CAMBRELLE® PBS 3.

By means of a hole punching tool having the shape of the element 12 of FIG. 3A, six sheets of preimpregnated carbon fabric and four sheets of Cumbrously are cut. Three sheets of preimpregnated carbon fabric are stacked to form the outer layer 4, then four sheets of Cumbrously are stacked to form the core 2, and finally three sheets of preimpregnated carbon fabric are stacked to form the other outer layer 3.

This stack or superimposition of sheets/plies is then placed in the female portion of an appropriately shaped mold; the male portion of this mold is then applied on the stack or superimposition of sheets/plies by means of a flat press of the type of those commercialized by SATIM corporation, applying heat at 150° C. for 10 minutes and pressure at 4 bars.

The sole element 12 is extracted as a composite laminate from the mold; it is allowed to cool for 10 minutes; and the finishing operations, such a trimming, are undertaken.

The sole element 12 thus manufactured is light, economical, and has the expected mechanical properties in terms of longitudinal bending and transverse stiffness.

EXAMPLE 2

This example is related to the manufacture of composite laminate rectangular test pieces and of a specimen test piece, evaluation of these test pieces in the rigidity test Tf and in a shock absorption test, then measurement of the lightness of the laminate.

2.1 Manufacture of the Test Pieces

The manufactured test pieces are parallelepipedic rectangles measuring 80×50 mm. They are made in the same manner as the sole elements 12 whose manufacture is described hereinabove. These test pieces have the same constitution and the same thickness as this sole element 12 manufactured as described above. The only difference between the test pieces is due to the type of fibrous reinforcement of the core 2 which is varied.

The standard/specimen test piece made of carbon fibers has the same dimensions and the same shape as the composite laminate test pieces tested. Its manufacture is described hereinabove, in connection with the procedure for the test Tf.

2.2 Rigidity R

The rigidity R of nine composite laminates according to the invention was measured with respect to a reference specimen or standard constituted by an integral test piece made of carbon fibers as defined hereinabove, as a function of the thickness of the core in relation to the thickness of the layers. One thus obtains 9 curves, a-I, shown in FIG. 4. Table 1 below provides the type of the test pieces for the composite laminate tested.

TABLE 1

| Curve | Type of fibrous reinforcement of the core 2 | Origin/ Commercial Name |
|---|---|---|
| a | Silk | Fabric for Garment Making |
| b | Non-woven of polyamide micro-fibers | CAMBRELLE PBS3 |
| c | Linen | Fabric for Garment Making |
| d | Woven of polyamide micro-fibers | BONTEX BOSTITCH NXT 0.9 |
| e | Non-woven of polyamide micro-fibers | CAMBRELLE PBS4 |
| f | Jute | Fabric for Garment Making |
| g | Leno | Fabric for Garment Making |

TABLE 1-continued

| Curve | Type of fibrous reinforcement of the core 2 | Origin/ Commercial Name |
|---|---|---|
| h | Cotton | Fabric for Garment Making |
| i | Synthetic silk | BEMBERG |

Figure 4:
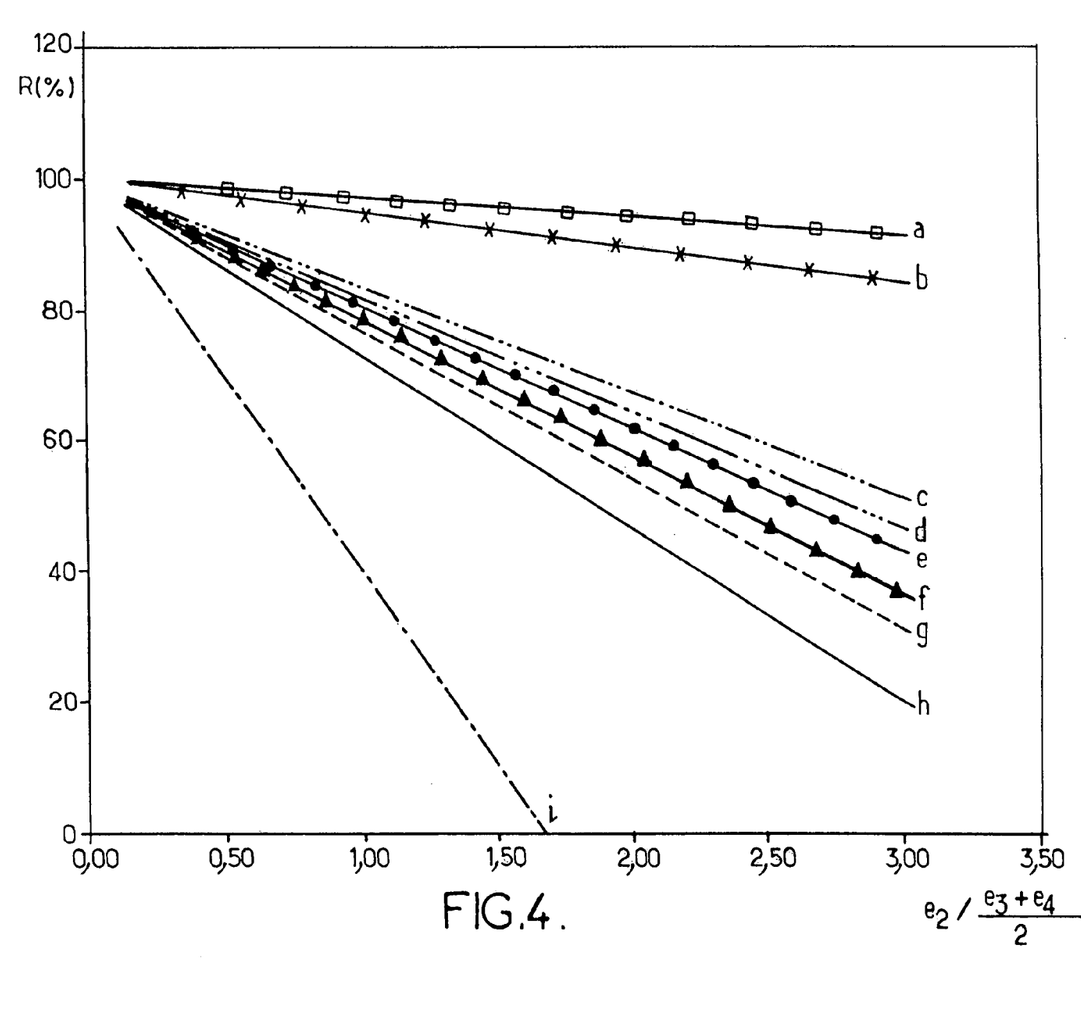
FIGS. 4-6 are graphs providing the change in the mechanical strength in relation to a composite standard (100%) made of carbon fibers as a function of the ratio of the thickness of the core to the average of the thicknesses of the layers (or layer thickness mean value)

FIG. 4 shows that for ratios $$e_2 \Big/ \frac{e_3 + e_4}{2}$$

on the order of 0.5, the properties of the composite laminates 1 of the invention can be compared to those of the standard made of carbon fibers.

Figure 5:
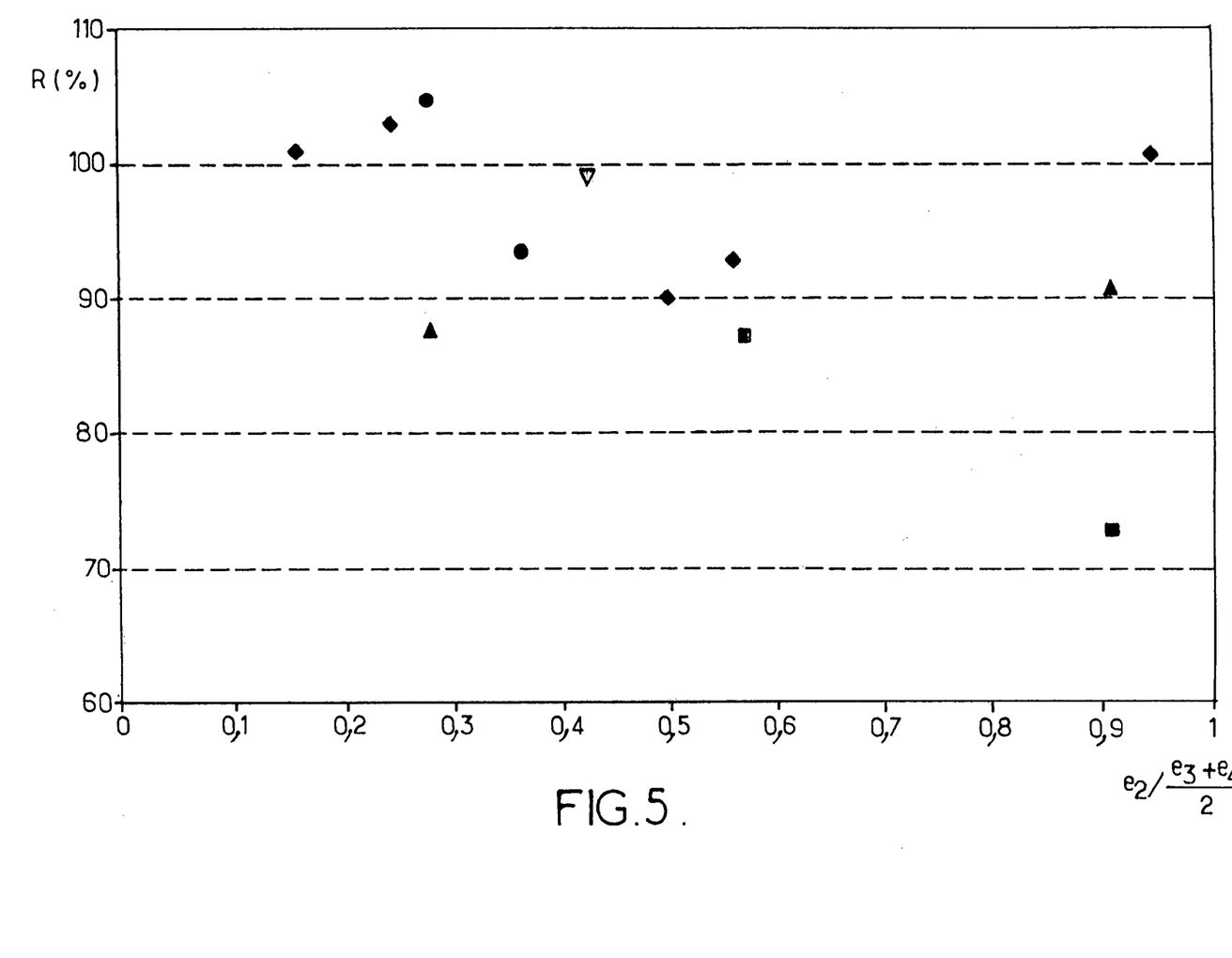

FIG. 5 shows the results obtained for fibrous reinforcements of the core of the composite laminate according to the invention, made of silk of various types. Table 2 below specifies the type and origin of the silks used.

TABLE 2

| Curve | Type of fibrous reinforcement of the core 2 | Origin/ Commercial Name |
|---|---|---|
| ♦ | Silk | CONFECTION |
| ■ | Wild silk | TUSSAH 6342 |
| ▲ | Silk | SHAPPE 11122 |
| ● | Silk | TWILL ADC 79095 |
| ▽ | Silk velvet 200 g | CONFECTION |

Figure 6:
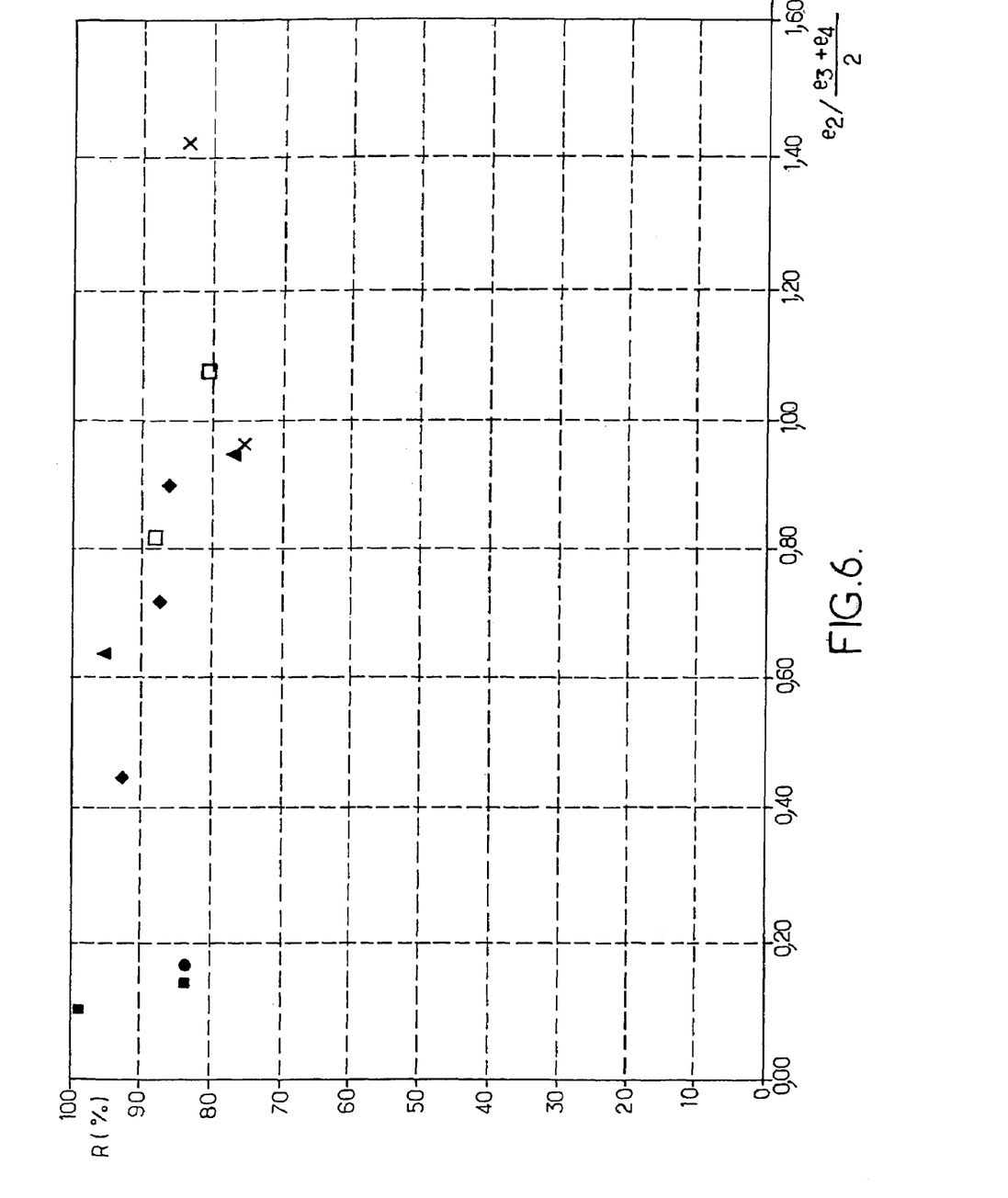

FIG. 6 also provides relative rigidity results for laminate compounds whose core A has a fibrous reinforcement made of paper with respect to a standard made of carbon fibers. Table 3 lists papers used for the core of the composite laminate according to the invention.

TABLE 3

| Curve | Type of fibrous reinforcement of the core 2 |
|---|---|
| ♦ | Towel Paper |
| ■ | Newsprint |
| ▲ | Drawing paper |
| X | Blotting paper |
| □ | Aquarelle paper |
| ● | Kraft |

2.3 Shock Absorption Properties

One evaluates the shock absorption properties of the test pieces of the composite laminates according to the invention, in which the fibrous reinforcement of the core is made of silk. These test pieces are parallelepipedic, measuring 70×8 cm for a thickness less than 3 mm. The test piece is fixed to a support at one of its ends. The free end is bent by a value equal to 65 mm in relation to the resting position of the test piece, then the test piece is allowed to oscillate while measuring the travel of the free end.

Figure 7:
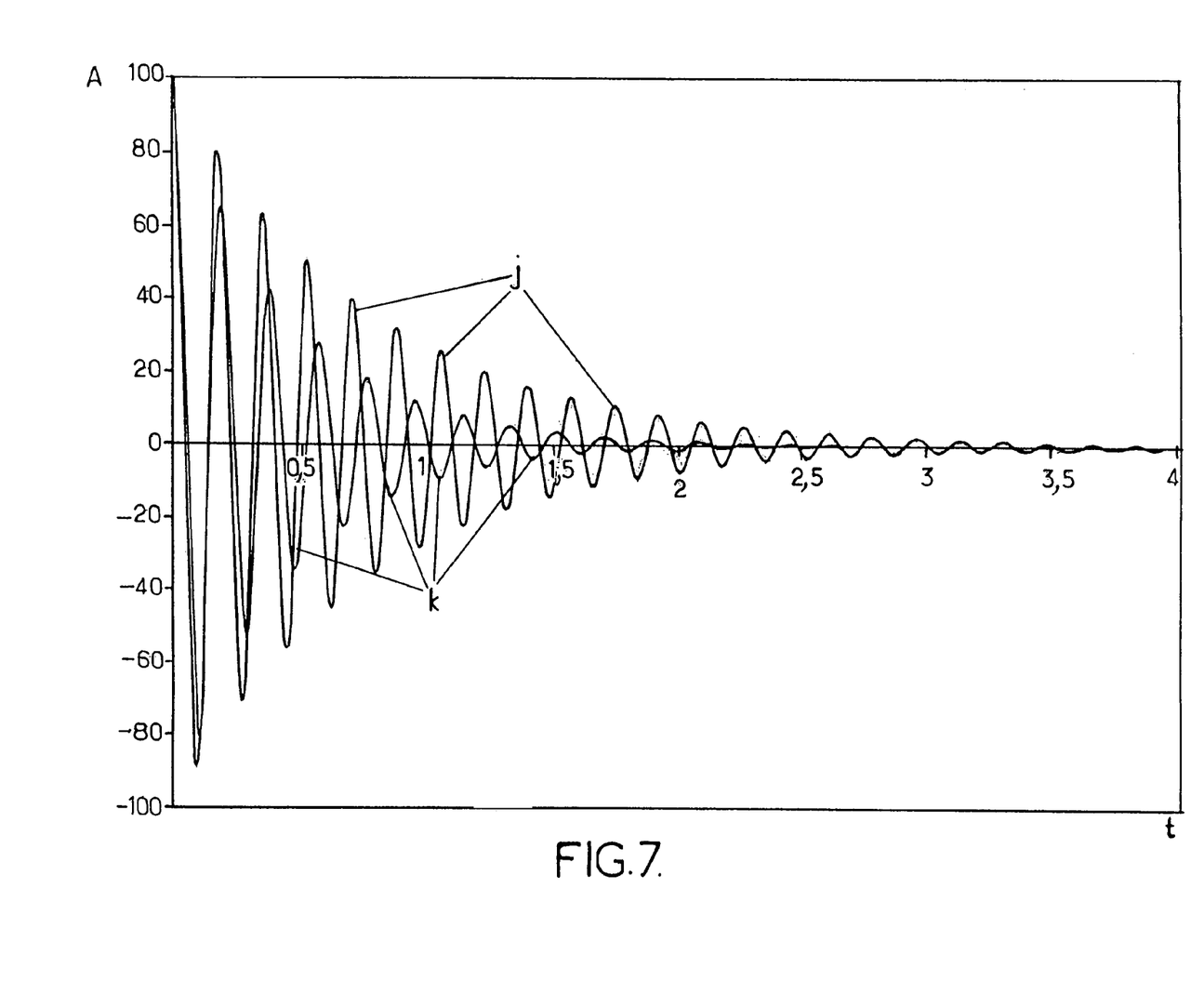
FIG. 7 shows a shock absorption curve of a laminate according to the invention in relation to a standard laminate made of a carbon fiber composite, as a function of time per seconds.

FIG. 7 shows the curve k of the shock absorption A as a function of the time t. This curve k is to be compared to the shock absorption A as a function of the time (curve i) obtained for a standard test piece having the same dimensions and the same shape as the test piece of the laminated composite to be tested, except that the standard is constituted by a composite of carbon fibers of the same type as those used for the specimen test piece of the rigidity R tests for the test Tf described hereinabove. The resin of the composite is identical for the composite laminate tested and for the specimen test piece made of carbon fibers. The comparison of the curves k, i shows that the composite laminate with fibrous reinforcement made of silk for the core has much better shock absorption properties A than the specimen test piece whose fibrous reinforcement is made of high performance carbon fibers.

2.4 Lightness

Figure 8:
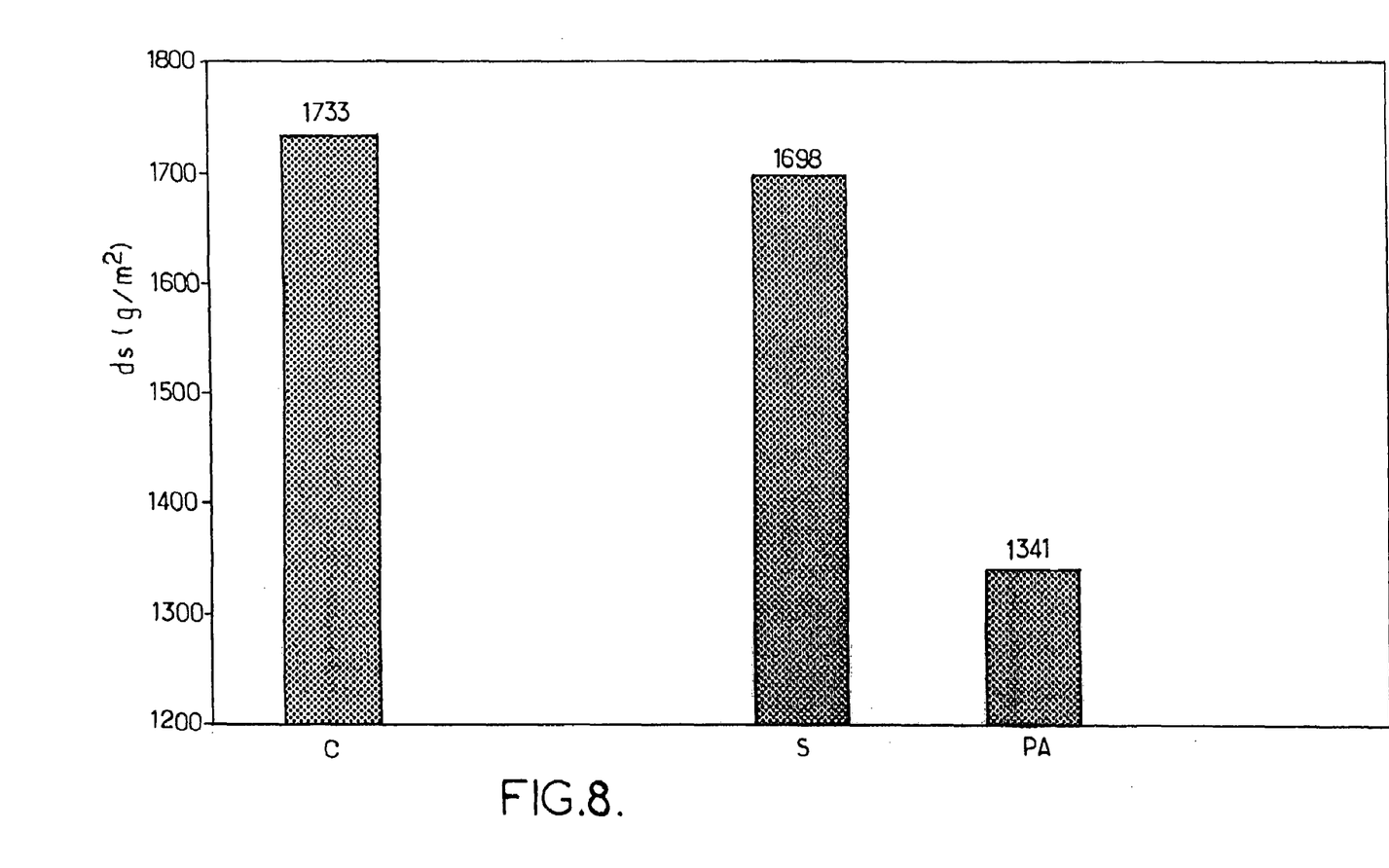
FIG. 8 is a histogram providing the surface density of two composite laminates according to the invention in relation to a single piece composite made of carbon fibers.

FIG. 8 provides, in the form of a histogram, the surface density ds of:
- the standard test piece made of carbon fibers in the examples 2.1 and 2.2: block C-ds=1733 g/m²;
- the test piece of the composite laminate according to the invention with a fibrous reinforcement made of silk for the core, such as implemented in the example 2.2: block S-ds=1698 g/m²;
- the test piece made of composite laminate whose core has a fibrous reinforcement made of CAMBRELLE PBS3, curve b, FIG. 4, example 2.1: bloc PA-ds=1341 g/m².

FIG. 8 shows the lightness qualities of the laminated compound according to the invention.

What is claimed is:

1. A laminate comprising:
    a sandwich structure comprising:
        two layers of a composite material containing fibers;
        a core consisting essentially of a fiber-reinforced composite material, said core being positioned between the two layers;
        at least a portion of the fibers of the core having a mechanical strength lower than a mechanical strength of at least a portion of the fibers of at least one of the two layers;
        the fibers of the core comprising a member selected from the group consisting of synthetic fibers, natural fibers, cellulose fibers, or a mixture of any of combination of synthetic, natural, and cellulose fibers, the synthetic fibers comprising a member selected from the group consisting of polyamide fibers, polyolefine fibers, polyester fibers, and polyesterimide fibers, and the natural fibers comprising a member selected from the group consisting of silk fibers, cotton fibers, linen fibers, jute fibers, and hemp fibers;
        the laminate having a total thickness e less than or equal to 3 mm;
        the core having a thickness $e_2$ and the two layers have a total thickness $e_3+e_4$, a ratio between the thickness of the core and the total thickness of the two layers being defined as follows:

$$e_2 \Big/ \frac{e_3 + e_4}{2} \leq 5.$$

2. A laminate according to claim 1, wherein:
    the ratio between the thickness of the core and the total thickness of the two layers are defined as follows:

$$e_2 \Big/ \frac{e_3 + e_4}{2} \leq 4.$$

3. A laminate according to claim 1, wherein:
    the ratio between the thickness of the core and the total thickness of the two layers are defined as follows:

$$e_2 \Big/ \frac{e_3 + e_4}{2} \leq 3.5.$$

4. A laminate according to claim 1, wherein:
    the fibers of the core comprise fibers oriented within the composite material of the core.

5. A laminate according to claim 1, wherein:
    the fibers of the core comprise woven fibers.

6. A laminate according to claim 1, wherein:
    the fibers of the core comprise non-woven fibers.

7. A laminate according to claim 1, wherein:
    the fibers of the core comprise fibers randomly situated within the composite material of the core.

8. A laminate according to claim 1, wherein:
    the fibers of said at least one of the two layers comprise fibers made of a material comprising a member selected from the group consisting of polyolefine, oriented and stretched high-density polyethylene, polyamide, VECTRAN®, and SPECTRA®.

9. A laminate according to claim 1, wherein:
    the fibers of said at least one of the two layers comprise metallic fibers or metallic micro-fibers.

10. A laminate according to claim 9, wherein:
    the fibers of said at least one of said two layers comprise fibers made of a material comprising a member selected from the group consisting of aluminum, titanium, and boron.

11. A laminate according to claim 1, wherein:
    the fibers of the core comprise micro-fibers having a characteristic of rupture stress CR of less than or equal to 1,500 Mpa.

12. A laminate according to claim 1, wherein:
    the core comprises a plurality of superimposed plies of composite material.

13. A laminate according to claim 1, wherein:
    at least one of the two layers comprises a plurality of superimposed plies of composite material.

14. A laminate according to claim 12, wherein:
    at least one of the two layers comprises a plurality of superimposed plies of composite material.

15. A laminate according to claim 1, wherein:
    at least one of the two layers is transparent so that the core is visible, the core comprising decorating elements.

16. A laminate according to claim 1, wherein:
    the laminate has a tensile strength R in a bending test Tf relative to a specimen test piece made of a carbon fiber composite having the same shape and rigidity as those of the test pieces tested, such that R is greater than or equal to 50 N/mm.

17. A method of manufacturing a laminate according to claim 1, wherein:
    the core comprises at least one ply;
    each of the two layers comprises at least one ply;
    the core and at least the two layers are superimposed;
    the plies of the core and each of the layers comprise plies of woven or non-woven micro-fibers, oriented or non-oriented micro-fibers, and fibers preimpregnated with resin or non-preimpregnated with resin.

18. A laminate comprising:
    a sandwich structure having a total thickness no greater than 3 mm, said sandwich structure comprising:

a core consisting essentially of a composite, the composite comprising a polymer resin matrix reinforced with fibers, the fibers of the composite consisting essentially of fibers having a modulus M in longitudinal traction of less than or equal to 50,000 Mpa;

two fiber-reinforced composite layers, the core being positioned between the two layers, fibers of the two layers being different from the fibers of the core;

both of the two fiber-reinforced composite layers having a modulus M in longitudinal traction of less than or equal to 50,000 Mpa;

the core having a thickness $e_2$ and the two layers have a total thickness $e_3+e_4$, a ratio between the thickness of the core and the total thickness of the two layers being defined as follows:

$$e_2 \Big/ \frac{e_3+e_4}{2} \leq 5.$$

19. A laminate according to claim 18, wherein the fibers of the core have:

a rupture force in longitudinal traction of less than or equal to 1,500 Mpa;

an elongation at rupture in longitudinal traction of equal to or greater than 1.0%.

20. A laminate according to claim 18, wherein:
the fibers of the core comprise micro-fibers having a modulus M in longitudinal traction of less than or equal to 30,000 Mpa.

21. A laminate according to claim 18, wherein:
the fibers of the core comprise micro-fibers having a modulus M in longitudinal traction of less than or equal to 20,000 Mpa.

22. A laminate according to claim 18, wherein:
the ratio between the thickness of the core and the total thickness of the two layers is defined as follows:

$$e_2 \Big/ \frac{e_3+e_4}{2} \leq 4.$$

23. A laminate according to claim 18, wherein:
the ratio between the thickness of the core and the total thickness of the two layers is defined as follows:

$$e_2 \Big/ \frac{e_3+e_4}{2} \leq 3.5.$$

24. A laminate according to claim 18, wherein:
said core consists essentially of said composite.

* * * * *